United States Patent
Moretti

[15] 3,699,192
[45] Oct. 17, 1972

[54] PHOSPHONIUM COMPOUNDS

[72] Inventor: Peter A. Moretti, Cranston, R.I.

[73] Assignee: U.S. Oil Company, Incorporated, East Providence, R.I.

[22] Filed: Oct. 20, 1970

[21] Appl. No.: 82,496

[52] U.S. Cl. ..................260/926, 117/62, 117/2, 117/136, 117/143 R, 117/144, 260/45.9 R, 260/943, 260/968, 260/970, 260/984, 260/858, 424/204

[51] Int. Cl. ........C07f 9/38, D06m 1/100, A01n 9/36

[58] Field of Search......................260/926, 968, 948

[56] References Cited

UNITED STATES PATENTS 2,798,086  7/1957  Coover et al. .........260/984 X
3,374,292  3/1968  Zahir..........................260/943

Primary Examiner—Lewis Gotts
Assistant Examiner—Anton H. Sutto
Attorney—Cushman, Darby & Cushman

[57] ABSTRACT

A di lower alkyl phosphite acrylamide or methacrylamide, preferably with formaldehyde and tetrakis (hydroxymethyl) phosphonium halide are reacted to form a compound of the formula

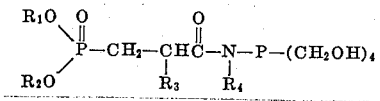

where $R_1$ and $R_2$ are lower alkyl $R_3$ is hydrogen or methyl and $R_4$ is hydrogen or methylol. The compounds are useful as fire retardants, particularly in textiles, paper and other forms of cellulosic fibers as well as synthetic fibers.

7 Claims, No Drawings

PHOSPHONIUM COMPOUNDS

The present invention relates to novel organic phosphorous compounds and their use as fire retardants.

Tetrakis (hydroxymethyl) phosphonium chloride (and the corresponding bromide) is a known fire retardant for cellulose, textiles, etc. However, it imparts an undesirable after odor. Furthermore, it is not as easily activated as would be desired. Additionally it is relatively expensive for the amount of phosphorus contributed as a fire retardant. N-hydroxymethyl-3-(dimethylphosphono) propionamide is also known as a fire retardant, however, its use with cellulose requires the addition of a resin such as melamine-formaldehyde resin to react with the cellulose and give durability.

It is an object of the present invention to prepare a novel phosphorous compound.

Another object is to develop improved fire retardant compositions.

Still further objects and the entire scope of applicability of the present invention will become apparent from the detailed description given hereinafter; it should be understood, however, that the detailed description and specific example, while indicating preferred embodiments of the invention, are given by way of illustration only, since various changes and modifications within the spirit and scope of the invention will become apparent to those skilled in the art from this detailed description.

It has now been found that these objects can be attained by reacting a di lower alkyl phosphite with acrylamide or methacrylamide. The product either in separated or unseparated form is then reacted with tetrakis (hydroxymethyl) phosphonium halide, e. g. tetrakis (hydroxymethyl) phosphonium chloride or tetrakis (hydroxymethyl) phosphonium bromide. Preferably there is added a formaldehyde source, e. g. aqueous formaldehyde, alcoholic formaldehyde, trioxane or paraformaldehyde prior to adding the phosphonium halide. If the formaldehyde is omitted less reactivity of the product with cellulose and other polymers is noted at low ratios of phosphonium halide to the reaction product of phosphite and unsaturated amide. If desired all of the reactants can be employed initially, e. g. (1) phosphite, (2) amide and (3) phosphonium halide or (1) phosphite, (2) amide, and (3) formaldehyde and (4) phosphonium halide, but the yields of the product are not as high as when the reaction is carried out in the preferred order.

The products of the invention have the formula

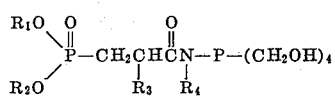

where $R_1$ and $R_2$ are lower alkyl, $R_3$ is hydrogen or methyl and $R_4$ is hydrogen or methylol. When a formaldehyde source is used as a reactant $R_4$ is methylol and where the formaldehyde source is omitted $R_4$ is hydrogen.

As starting dialkyl phosphites there can be used, for example, dimethyl phosphite, diethyl phosphite, dipropyl phosphite, diisopropyl phosphite, methyl ethyl phosphite.

The secondary phosphite and amide are reacted in equimolar proportions. The reaction can be carried out in the presence or absence of a catalyst, preferably a non acidic catalyst is used such as metallic sodium, potassium and lithium, alkali metal amides such as sodamide, alkali metal hydrides, such as sodium hydride, potassium hydride and lithium hydride, alkali metal alcoholates and phenolates, e. g. sodium methylate, potassium methylate, sodium ethylate, sodium propylate, potassium isopropylate and sodium phenolate, sodium hydroxide, anion exchange resins, secondary and tertiary amines, alkali metal salts of the secondary phosphites, etc. The reaction is preferably carried out in a solvent, e. g. water or more preferably an alcohol such as methyl alcohol, ethyl alcohol, propyl alcohol or isopropyl alcohol. Mixtures of water and alcohol can be used. The reaction is carried out at reflux at pH of 8 ± 1 for 3 to 5 hours.

Instead of reacting the secondary phosphite and amide in situ there can be employed preformed amides of the type shown in Johnston U.S. Pat. No. 2,754,320, e. g. 3-(dimethylphosphono) propionamide 3-(diethylphosphono) propionamide, 3-(dipropylphosphono) propionamide, 3-(diisopropylphono) propionamide, 3-(methyl ethyl phosphono) propionamide, 3-(dimethyl-phosphono)-2-methyl-propionamide, 3-(diethylphosphono)-2-methyl-propionamide.

When a formaldehyde source is employed it can be used in an amount of ¾ to 2 moles per mole of starting acrylamide or methacrylamide (or ¾ to 2 moles per mole of preformed 3-(dialkylphosphono) propionamide), but is preferably used in an amount of 1 ¼ moles per mole of amide. There can be employed the same solvents as mentioned earlier, e. g. water and alcohols. Alternatively the formaldehyde can be pre-reacted as shown in Zahir U.S. Pat. No. 3,374,292 to form N-hydroxy-methyl amides such as N-hydroxymethyl-3-(dimethyl-phosphono) propionamide, N-hydroxymethyl-3-(diethylphosphono) propionamide, N-hydroxymethyl-3-)di-isopropylphosphono) propionamide, N-hydroxymethyl-3-(dipropylphosphono) propionamide, N-hydroxymethyl-3-(methyl ethyl phosphono) propionamide, N-hydroxymethyl-3-(dimethylphospono)-2-methyl-propionamide, N-hydroxymethyl-3-(dipropylphosphono)-2-methylpropionamide, N-sesqui methylol-3-(dimethylphosphono)-propionamide or the corresponding amide having an average of 1 ¼ methylol groups per nitrogen atom.

The reaction with the phosphonium halide, e. g. tetrakis (hydroxymethyl) phosphonium chloride (THPC) is carried out using a ratio of 0.1 to 2 moles of phosphonium halide per amide group, the preferred ratio being 1 : 1. For best results the solution of amide or (methylol amide) intermediate in the alcohol and/or water after stripping out a portion of the solvent. The weight ratio of the amide or (methylol amide) intermediate to THPC can be from 1 : 0.1 up to 1 : 2, or even higher, e. g. 1 : 5. The preferred ratio is 1 : 1.

Examples of compounds within the present invention are N-tetrakis (hydroxymethyl) phosphonium 3-(dimethylphosphono) propionamide, N-tetrakis (hydroxymethyl) phosphonium 3-(diethylphosphono) propionamide, N-tetrakis (hydroxymethyl) phosphonium-3-(methyl ethyl phosphono) propionamide, N-tetrakis (hydroxymethyl) phosphonium-3-(dipropylphosphono) propionamide, N-tetrakis (hydroxymethyl) phosphonium-3-(diisopropylphosphono) propionamide, N-tetrakis (hydroxymethyl) phosphonium-3-(dimethylphosphono)-2-methylpropionamide, N-tetrakis(hydroxymethyl) phos-phonium-3-(dipropylphosphono)-2-methylpropionamide, N-tetrakis (hydroxymethyl) phosphonium N-hydroxymethyl-3-(dimethylphosphono) propionamide, N-tetrakis (hydroxymethyl) phosphonium N-hydroxymethyl-3-(diethylphosphono) propionamide, N-tetrakis (hydroxymethyl) phosphonium N-hydroxymethyl-3-(ethyl methyl phsophono) propionamide, N-tetrakis (hydroxymethyl) phosphonium N-hydroxymethyl-3-(dipropylphosphono) propionamide, N-tetrakis (hydroxymethyl) phosphonium N-hydroxymethyl-3-(diisopropylphosphono) propionamide, N-tetrakis (hydroxymethyl) phosphonium N-hydroxymethyl-3-(dimethylphosphono)-2-methylpropionamide, N-tetrakis (hydroxymethyl) phosphonium N-hydroxymethyl-3-(dipropylphosphono)-2-methyl propionamide.

The products of the invention can be employed as fire retardants in aqueous or alcoholic solution and hence can be employed as they are prepared. Alternatively the solvent can be removed by evaporation to dryness, preferably by vacuum stripping. When they are evaporated to dryness they are usually viscous, tacky, water clear to yellowish materials. However, at higher mole ratios of the amide or methylol amide to phosphonium halide, e. g. 5 : 1, they are solids.

The fire retardant products of the present invention have less after odor than tetrakis (hydroxymethyl) phosphonium chloride when applied.

The compounds of the present invention by themselves also will cross link with hydroxyl containing polymers such as cellulose and cellulose esters.

The products of the present invention are particularly useful as fire retardants for use in the textile field, e. g. with cellulosic fibers such as cotton and regenerated cellulose, cellulose acetate, cellulose propionate, cellulose acetate-propionate, cellulose acetate butyrate, Dacron (polyethylene terephthalate)-cotton blends, etc. They can be used as fire retardants for plywood and paper.

Additionally they are useful as fire retardants and reactive plasticizers in making polyurethanes and they are useful as fungicides, e. g. in treating textiles, the soil or plants, etc.

The can be used in mass spinning of polyesters, e. g. Dacron, acrylic fibers. e. g. acrylonitrile-vinyl chloride copolymers (85:15) modacrylic fibers, nylon (polyamide fibers, e. g. nylon, 6,6 or nylon 6) to give fire proofing properties.

When treating textiles the compounds are employed in aqueous or alcoholic solution (e. g. methanol, ethanol, isopropanol) or aqueous alcohol, e. g. as a solution containing 80 percent solids although the solids content of the solution is not critical. The compounds are normally used in an amount (dry basis) of 5 – 40 percent, preferably 16 – 24 percent of the weight of the textile.

There can be added any of the conventional additives for treating textiles such as the methylol melamines, e. g. trimethylol melamine, tetramethylol malamine, pentamethylol melamine, hexamethylol malamine, alkoxylated methyl melamines, e. g. trimethoxymethyl melamine, tetramethoxymethyl malamine, pentamethoxymethyl melamine and other triazine formaldehyde products, e. g. as set forth in Widmer U.S. Pat. No. 2,197,357, urea formaldehyde, dimethylol dihydroxyethylene urea, glycol resins, dimethylol ethyl triazone and other triazones. These resins and resin precursors, however, can be omitted since the compounds of the present invention by themselves react with cellulose, for example, to give durability and cross linking.

In cross linking cellulose there can be used conventional initiators or catalysts such as metal salts, e. g. zinc chloride, zinc nitrate, magnesium chloride, zinc borofluoride ($ZnBF_4$), amine hydrochlorides, etc. The catalysts can be used, for example, in an amount of 0.5 – 30 percent by weight of the compounds of the invention. The compounds of the present invention are much more easily activated then tetrakis (hydroxymethyl) phosphonium chloride.

It will be appreciated that mixtures of compounds can be prepared and used, e. g. a mixture of N-tetrakis (hydroxymethyl) phosphonium-3-(dimethyl phosphono) propionamide and N-tetrakis (hydroxymethyl) phosphonium N-methylol-3-dimethyl phosphono) propionamide in mole ratio of 1 : 0.1, e. g. 1 : 1.

Unless otherwise indicated all parts and percentages are by weight.

EXAMPLE 1

There were added to a reactor 33.0 pounds of commercial 95 – 98 percent methanol and 36.3 pounds of dimethyl hydrogen phosphite (dimethyl phosphite) and the mixture stirred. There was added 23.5 pounds of acrylamide and the mixture heated to 70° C. Next the temperature was raised to 80° C. (reflux). The pH as maintained at 8.5–9 by the slow dropwise addition of 3375 ml. of 20 percent sodium methylate in methanol. The reflux and pH were maintained for 3 hours. The heat was shut off and the intermediate product cooled to 45° C. Then 26.8 pounds of 37% aqueous formaldehyde were added slowly over about one half hour. The pH was adjusted to 7.5 – 8.0 with 375 ml. of 20 percent aqueous sodium hydroxide. Reaction was continued at 60° – 65° C. for one hour while maintaining the pH at 7.5 – 8.0. The mixture was cooled to room temperature and vacuum stripped to 80 percent non volatile solids (NVS).

EXAMPLE 2

To 95 parts of the final product of Example 1 there was slowly added 5 parts of tetrakis (hydroxymethyl) phosphonium chloride (THPC) in water with stirring. The mixture was heated to 120° F. and held at 120° –175° F. for one half hour. The pH was about 4.0 – 5.0. The product was cooled to 80° F. and drawn. If desired the product can be filtered.

EXAMPLE 3

To 83.4 parts of the final product of example 1 there was slowly added 16.6 parts of 80 THPC in water with stirring and the procedure of example 2 followed. The pH of the product was about 3.5 – 4.0.

EXAMPLE 4

The procedure of example 2 was repeated using 50 parts of the product of example 2 and 50 parts of 80 percent THPC in water. The heating was at 120° – 130° F. The pH of the product was 2.5 – 3.0.

EXAMPLE 5

The procedure of example 1 was repeated except the addition of formaldehyde was omitted to product N-tetrakis (hydroxymethyl) phosphonium-3-(dimethylphosphono) propionamide.

EXAMPLE 6

Five finishing formulations suitable for treating textiles, e. g. cotton, were prepared as follows:

(a)

| | |
|---|---|
| Fire retardant product of Example 2 | 30.0 parts |
| Tetramethylolmelamine (60% solids in water) | 10.0 parts |
| 30% aqueous polyethylene emulsion | 2.0 parts |
| Urea | 2.0 parts |
| Ammonium chloride | 0.4 parts |
| Water | 55.6 parts |
| Total: | 100.0 |

(b)

| | |
|---|---|
| Fire retardand product of example 2 | 30.0 parts |
| Tetramethylol melamine (60% solids) | 10.0 parts |
| 30% polyethylene emulsion | 2.0 parts |
| Urea | 2.0 parts |
| Zinc nitrate hexahydrate | 0.2 parts |
| Water | 55.8 parts |
| Total: | 100.0 |

(c)

| | |
|---|---|
| Fire retardant product of example 3 | 30.0 parts |
| Tetramethylol melamine (60% solids) | 10.0 parts |
| 30% polyethylene emulsion | 2.0 parts |
| Urea | 5.0 parts |
| Ammonium chloride | 0.5 parts |
| Water | 52.5 parts |
| Total: | 100.0 |

(d)

| | |
|---|---|
| Fire retardant product of example 3 | 30.0 parts |
| Dimethylol dihydroxy ethylene urea | 10.0 parts |
| 30% polyethylene emulsion | 2.0 parts |
| Urea | 5.0 parts |
| Zinc nitrate hexahydrate | 0.2 parts |
| Water | 52.8 parts |
| Total: | 100.0 |

(e)

| | |
|---|---|
| Fire retardant product of example 3 | 30.0 parts |
| Dimethyl ethyl triazone | 10.0 parts |
| 30% polyethylene emulsion | 2.0 parts |
| Urea | 5.0 parts |
| Ammonium chloride | 0.4 parts |
| Water | 52.6 parts |
| Total: | 100.0 |

Textiles, e. g. cotton, are impregnated with any one of the compositions of example 6(a) through (e) and then dried to give a flame proof product. Preferably the drying is carried out at a curing temperature, e. g. 225° F.

What is claimed is:

1. A compound having the formula

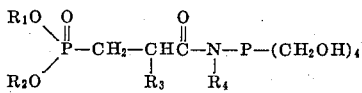

where $R_1$ and $R_2$ are lower alkyl, $R_3$ is hydrogen or methyl and $R_4$ is hydrogen or methylol.

2. A compound according to claim 1 wherein $R_4$ is hydrogen.

3. A compound according to claim 2 wherein $R_1$ and $R_2$ are methyl.

4. A compound according to claim 3 wherein $R_4$ is hydrogen.

5. A compound according to claim 1 wherein $R_4$ is methylol.

6. A compound according to claim 5 wherein $R_1$ and $R_2$ are methyl.

7. A compound according to claim 1 wherein $R_4$ is hydrogen.

* * * * *